United States Patent [19]
Brown

[11] Patent Number: 4,637,164
[45] Date of Patent: Jan. 20, 1987

[54] SQUIRREL GUARD

[76] Inventor: Harold O. Brown, 170 Landor Pl., Athens, Ga. 30606

[21] Appl. No.: 831,709

[22] Filed: Feb. 20, 1986

[51] Int. Cl.⁴ ............................................. A01G 17/12
[52] U.S. Cl. ............................................ 47/24; 43/106
[58] Field of Search ................... 47/24, 25, 26, 23, 32; 43/126, 106; 403/344; 411/540

[56] References Cited

U.S. PATENT DOCUMENTS

| 219,987 | 9/1879 | Scott | 47/24 |
| 333,362 | 12/1885 | Ursbruck | 411/190 |
| 694,208 | 2/1902 | Smith | 47/24 |
| 2,483,874 | 10/1949 | Bernhard | 47/24 |
| 2,978,837 | 4/1961 | Daniels | 47/25 |
| 3,036,554 | 5/1962 | Johnson | 119/106 |
| 4,341,039 | 7/1982 | Reese | 47/24 |

FOREIGN PATENT DOCUMENTS 490228  4/1919  France ..................................... 47/24

*Primary Examiner*—James R. Feyrer
*Assistant Examiner*—Bradley M. Lewis
*Attorney, Agent, or Firm*—Shlesinger, Arkwright, Garvey & Fado

[57] ABSTRACT

An animal guard for tree trunks comprising an annular flexible plate having a central circular opening and a skirt portion completely around the central opening; at least one slot extending through the skirt forming the plate into a separable member having abutting edges; a pair of spaced fastener holes in the skirt radially aligned and positioned adjacent one abutting edge of the slot; an inner and an outer spaced parallel arcuate slot in the skirt radially spaced from one another and positioned so that the fastener holes and the slots cooperate with each other when the plate is positioned in a truncated conical position about a tree trunk; the inner slot and associated fastener hole being a substantial distance closer to the inner periphery of the plate than the outer slot and associated fastener hole is to the outer periphery so as to not provide a gripping surface for an animal attempting to pass the guard.

17 Claims, 9 Drawing Figures

SQUIRREL GUARD

BACKGROUND AND FIELD OF THE INVENTION

This invention relates to the environmental control of squirrels and similar animals which cause damage to foliage and growing materials, particularly trees. The invention is specifically concerned with a unique type of physical barrier having the capability of preventing the passage of small climbing animals from reaching the upper portions of a tree.

Squirrels and similar animals which nest in trees, create a serious problem in various areas such as orchards, nurseries as well as domestic landscapes. These animals very often nest and feed on the leafs and fruit such as nuts growing in the upper reaches of the trees. The damage can be quite serious depending on the amount of infestation. From an economic standpoint alone, squirrels can rapidly strip a nut tree leaving nothing available for the grower to market. The use of chemical agents such as pesticides has not always been an effective solution. The pesticides must be continually applied, are quite expensive and very often cause more damage to the surrounding environment, not to mention the human population, than to the rodent at which it is directed.

Attempts have been made in the prior art at using physical barriers to prevent squirrels and similar animals from climbing into trees; however, these devices have been found to be only marginally effective at best.

Many of the prior art devices are cone shaped barriers having a central opening through which the tree trunk is positioned. The prior art U.S. Pat. No. of Brunson 104,418, Record No. 35,471 Parks No. 110,996 and Carder No. 2,999,479 all disclose tree guards based on this concept. Neither Parks No. 110,996 nor Record No. 35,471 are provided with adjustment means once the device is positioned around a tree trunk. Brunson No. 104,418 includes coil springs or ties to join the edges of the cone together. Carder No. 2,999,479 similarly employs two welded tongues for fastening the device around a tree. Because of the type of fastening means employed in both Carder and Brunson, the range of tree trunk sizes which the device will fit is limited. The straps provide only a small margin of adjustment. In addition, stretched coils and strap means extending along the outer margin of the guard provide the climbing animal with a secure footing and hold thereby allowing it to more easily pass the device.

OBJECTS AND SUMMARY OF THE INVENTION

It is, therefore, an object of the present invention to provide an animal guard for attachment to tree trunks which is provided with an adjustment means that allows a single device to be used with a wide range of tree sizes.

It is another object of this invention to effectively reduce the footing and gripping action of an animal trying to overcome such a barrier.

A further object of this invention is to provide a relatively simple and easily manufactured device that can be readily stored when in non-use.

Yet a further object of this invention is to provide a device which can be expanded to accomodate the growth of the tree being protected.

Another object of this invention is to provide a squirrel guard which when applied to the tree will not injure or damage the tree during the harvest time when on the tree for several weeks or months, even during growth.

To summarize this invention, it relates to an animal guard for tree trunks comprising an annular flexible plate having a central circular opening and a skirt portion completely around the central opening; at least one slot extending through the skirt forming the plate into a separable member having abutting edges; a pair of spaced fastener holes in the skirt radially aligned and positioned adjacent one abutting edge of the slot; an inner and an outer spaced parallel arcuate slot in the skirt radially spaced from one another and positioned so that the fastener holes and the slots cooperate with each other when the plate is positioned in a truncated conical position about a tree trunk; the inner slot and associated fastener hole being a substantial distance closer to the inner periphery of the plate than the outer slot and associated fastener hole is to the outer periphery so as to not provide a gripping surface for an animal attempting to pass the guard.

These and other object of this invention will be apparent from the following description and claims.

DESCRIPTION OF THE DRAWINGS

In the accompanying drawings which illustrate by way of example various embodiments of this invention.

DESCRIPTION OF THE DRAWINGS

Figure 2:
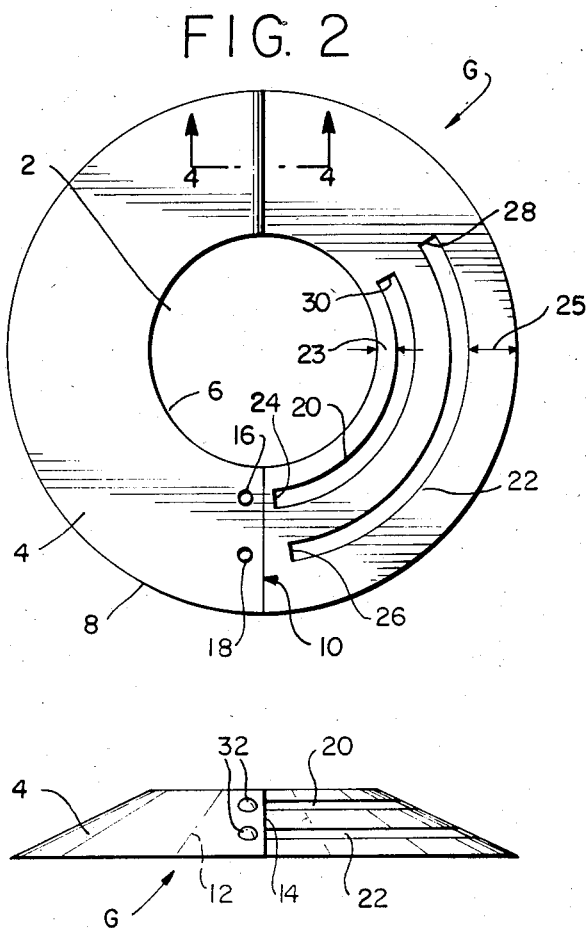
FIG. 2 is a top plan view of the invention in the flat planar position.

Referring now to the drawings and particularly to FIG. 2, there is shown the unassembled animal guard G in a flat planar position. The guard G comprises an annular flexible plate of metal, plastic or the like having a central circular opening 2 and a skirt portion 4 extending 360° around the opening 2. The skirt portion 4 includes an inner periphery 6 and an outer periphery 8. A slot 10 extends completely through the skirt portion 4 from the inner periphery 6 to the outer periphery 8 along a straight line extending from the center of circular opening 2.

Figure 5:
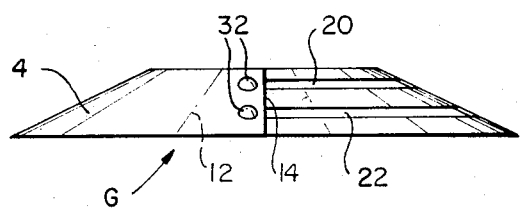
FIG. 5 is a side elevational view of the device as shown in FIG. 6.
Figure 6:
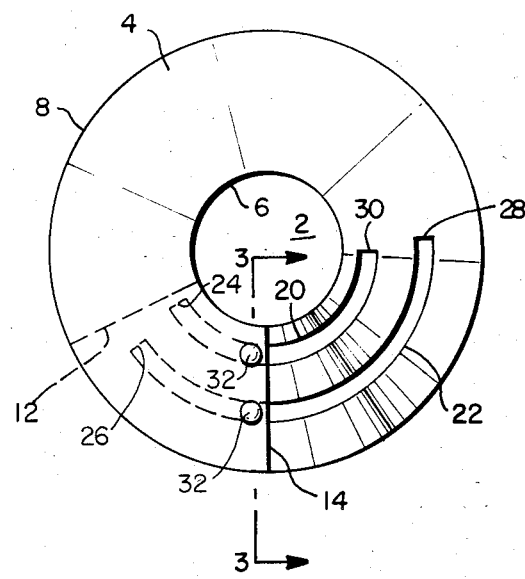
FIG. 6 is a top plan view of the device in the second truncated conical position.

The slot 10 includes abutting edges 12 and 14 as best shown in the assembled position of FIGS. 5 and 6. Referring back to FIG. 2, the skirt portion 4 includes inner fastener hole 16 and outer fastener hole 18 radially aligned and positioned adjacent abutting edge 12.

Extending from abutting edge 12 and radially aligned with inner fastener hole 16 and outer fastener hole 18 are inner arcuate slot 20 and outer arcuate slot 22. Each of the arcuate slots 20 and 22 are positioned at a distance equal to the distance at which their respective fastener holes 16, 18 and positioned from the axis from the guard G. Hence, the inner fastener hole 16 and the inner arcuate slot 20 as well as the outer fastener hole 18 and the outer arcuate slot 22 cooperate with each other when the plate is in a second truncated conical position as best seen in FIGS. 5 and 6.

The inner slot 20 and its associated fastener hole 16 is a substantial distance closer to the inner periphery 6 as indicated by arrow 23 than the outer slot 22 and its associated fastener hole 18 to the outer periphery 8 as indicated by arrow 25. The positioning of the outer arcuate slot 22 from the outer periphery 8 limits and prevents a squirrel or other animal from trying to climb above the guard by placing the outer periphery 8 out of reach from the closest possible hold, arcuate slot 22.

Arcuate slots 20, 22 include end portions 24, 26 situated near abutting edge 12 situated in a staggered relation whereby the outer arcuate slot 22 is positioned further away from the abutting edge 12 than the inner arcuate slot 20. Consequently, leading end portion 28 of the outer arcuate slot 22 extends beyond the leading end portion 30 of the inner arcuate slot 20.

Referring back to FIGS. 5 and 6, it can be seen that when the inner and outer fastening holes 16, 18 are aligned with the inner and outer arcuate slots 20, 22. The skirt 4 assumes a truncated, conical position.

Figure 1:
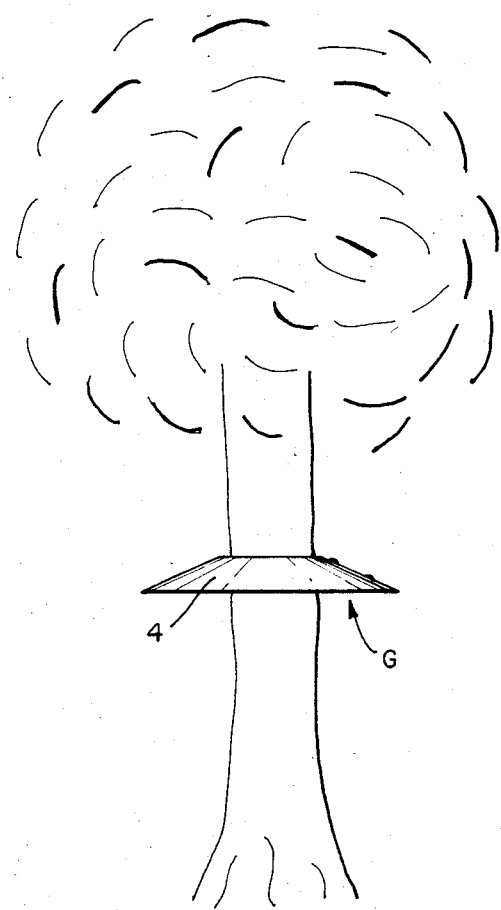
FIG. 1 is a side elevational view of the invention positioned for use on a tree.

In use, the device while in the flat planar position of FIG. 2 is opened along slot 10 and positioned on a tree with the tree trunk extending through central circular opening 2. As can be seen in FIG. 1, when the inner and outer fastener holes 16, 18 near abutting edge 14 are aligned over inner and outer arcuate slots 20 and 22, the diameter of central circular opening 2 decreases, thereby tightly fitting the inner periphery 6 to the tree trunk and causing the skirt portion 4 to assume the truncated conical position.

Figure 3:
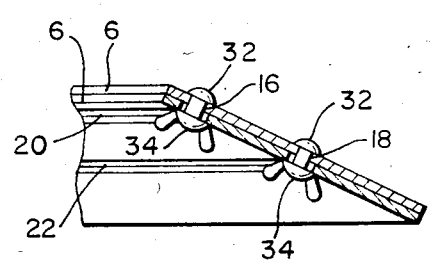
FIG. 3 is a cross sectional fragmentary view of the invention showing it in the second configured conical position with locking bolts.

As shown in FIG. 3, when the desired fit has been aquired around the tree trunk, a bolt means 32 is extended through each of the fastening holes 16, 18 and consequently, their respective slots 20, 22. A wing nut 34 or similar device is attached to the downwardly extending bolt means 32 and tightly secured. The nut 34 is on the underside, since a squirrel might be able to grab a nut on the top side and then pull himself over the edge as squirrels are well known for their acrobatic ability to overcome obstacles.

Accordingly, the device can be tightened as well as loosened and transferred to a number of trees having varying trunk diameters. The length of the inner and outer slots 20, 22 provide for a wide range of adjustment. It is preferred that the skirt portion 4 have a minimum radius of about 8 inches. However, the central circular opening 2 may vary depending on the maximum size of the tree trunk which is to be fitted.

The guard may be constructed of materials ranging from synthetic plastics to various sheet metals. The one requirement of the construction material is that it be flexible enough for bending and adjustment while retaining a sufficient degree of shape and rigidity. A material having a low coefficient of friction is especially desired as this type of surface would reduce traction for an animal attempting to climb over the guard.

Figure 8:
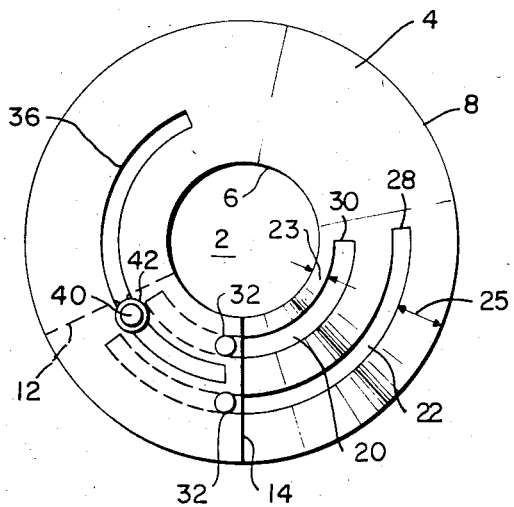
FIG. 8 is a top plan view of a modification of the invention showing a third arcuate slot.
Figure 9:
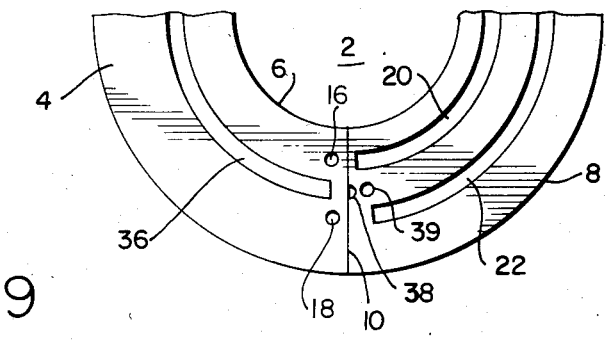
FIG. 9 is a fragmentary top plan view of a modification of the invention as shown in FIG. 6.

As can be seen in FIGS. 8 and 9, a further modification of the invention provides for a third arcuate slot 36 extending radially from the axis of central circular opening 2 and along a position on skirt portion 4 preferably equidistance between the inner fastener hole 16 and outer fastener hole 18 in an arcuate direction away from abutting edge 14. A fastening notch 38 is formed in the abutting edge 12 so as to align and cooperate with the third arcuate slot 36 when the plate is in the truncated conical position around a tree trunk. A bolt and wing nut means 40 along with a standard washer 42 secure the abutting edge 12 to the underside of skirt portion 4. Optionally a fastener hole 39 may be included or substituted with slot 38. The underlying edge 12 of the skirt portion 4 is firmly secured in this manner. Consequently, the skirt portion 4 retains a flush and rigid surface around the tree trunk and between overlying skirt portions 4, thereby eliminating the possibility of an additional hold onto which the animal may grab.

Figure 7:
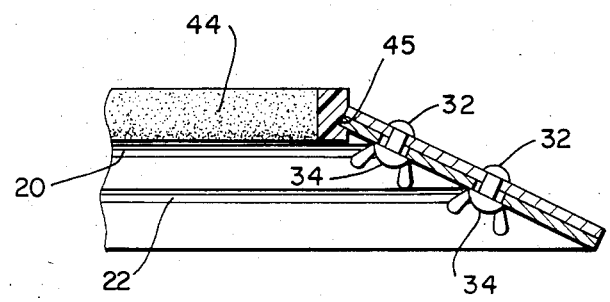
FIG. 7 is a modification of the invention shown in FIG. 3.

Referring now to FIG. 7, a resilient collar 44, such as a rubber or silicon O-ring is provided along the inner periphery 6 of the skirt portion 4 thereby protecting the tree from the tightly fitted guard G. A notch 45 in the outer perimeter of the collar 44 ensures a tight fit against periphery 6 of skirt 4. Numerous resinous seal compositions exist in the art and it is not the intention of the present invention to be limited by a particular seal. Any and all seal compositions which provide a resilient cushening joint between the tree bark and the skirt are preferred and inclusive within the scope of the present invention. Among such compositions are the natural and synthetic rubbers.

Figure 4:
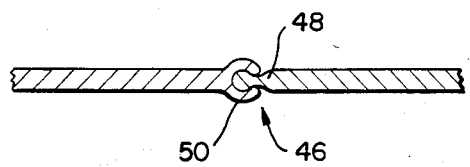
FIG. 4 is a cross-sectional view of FIG. 2 taken along lines 4—4 and showing a modified form of the edge connection.

FIG. 4 illustrates an interlocking means 46 which bisects the skirt portion 4 in a manner similar to slot 10. The interlocking means 46 comprises a male edge portion 48 as well as a cooperating female edge portion 50. Numerous interlocking means exist in the art and again, it is not the intention of the present invention to be limited by any particular interlocking means. Any and all interlocking means which extend along a planar surface are both preferred and inclusive within the scope of the present invention. Any number of interlocking means 46 can be situated along the surface of the skirt portion 4. The obvious advantage of such an arrangement would be improved storage as well as ease of assembly and disassembly.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention of the limits of the appended claims.

What is claimed is:

1. An animal guard for tree trunks comprising:
   (a) an annular flexible plate having a central circular opening therein and a skirt portion completely around said central opening:
   (b) said skirt portion having at all times a constant width and an inner and outer periphery;
   (c) said plate having a first flat planar position and a second truncated conical position and having at least one radial slit extending completely through said skirt from said inner to said outer periphery;
   (d) said radial slit forming said plate into a separable member having first and second radial edges of said slit when in said first flat position for permitting said plate to be positioned about a tree trunk;

(e) a pair of spaced fastener holes in said skirt radially aligned and position adjacent said first radial edge of said slit, one of which is the inner and the other of which is the outer fastener hole;

(f) a pair of spaced parallel arcuate slots in said skirt and radially spaced from each other one of which is the inner and the other of which is the outer arcuate slot;

(g) said arcuate slots being radially positioned so that said inner fastener hole and said inner arcuate slot and said outer fastener hole and said outer arcuate slot cooperate with each other respectively when said plate is in said second truncated conical position;

(h) each of said arcuate slots being spaced radially from the axis of said plate a distance substantially equal to the radial distance from the axis of said plate to their respective fastener holes;

(i) said arcuate slots being adjacent a second radial edge and extending arcuately in a direction away from said second radial edge through a substantial degree of arc;

(j) said inner arcuate slot and said inner fastener hole being a substantial distance closer to the inner periphery of said plate than said outer fastener holes and said outer arcuate slot is to said outer periphery of said plate so as not to provide a gripping surface for an animal attempting to pass said tree guard;

(k) whereby when said plate is formed into said second truncated conical position and fastener means are positioned in said holes and through said arcuate aligned slots for positioning about a tree trunk, said plate may be adjusted to trunk size and said fastener means locked to prevent slippage in said slots thereby maintaining a tight fit at all times about said trunk;

(l) said plate includes a third arcuate slot extending radially from the axis of said plate along a position uniformly between said inner and said outer fastener holes in an arcuate direction away from said first radial edge and extending in a direction opposite to said inner and outer arcuate slots a distance substantially equal to said substantial degree of arc of said inner and outer arcuate slots, said third acruate slot is positioned intermediate said first and second arcuate slots; and, (m) a fastening notch formed in said second radial edge so as to align and cooperate with said third arcuate slot when said plate is in said second truncated conical position.

2. An animal guard as in claim 1 and wherein:
(a) said arcuate slots having end portions adjacent said second radial edge in a staggered relation whereby the outer arcuate slot end portion being positioned further away from said second radial edge than said inner arcuate slot end position.

3. An animal guard as in claim 1 and wherein:
(a) said spaced fastener holes include first bolt means for cooperating therethrough.

4. An animal guard as in claim 3 and wherein:
(a) said first bolt means provided with wing nuts positioned beneath said plate.

5. An animal guard as in claim 1 and wherein:
(a) said fastening notch includes second bolt means for cooperating therewith.

6. An animal guard as in claim 5 and wherein:
(a) said second bolt means provided with a wing nut and washer connecting to and positioning beneath said plate.

7. An animal guard as in claim 1 and wherein:
(a) said skirt portion having a minimum radius of about 8 inches and said central opening may vary depending on the tree trunk size.

8. An animal guard as in claim 1 and wherein:
(a) said central circular opening provided with an annular flexible collar so as to protect the tree when said guard is positioned around the tree trunk.

9. An animal guard as in claim 8 and wherein:
(a) said collar is provided with an outer circumferential groove cooperating with the edge portion of said opening of said plate.

10. An animal guard as in claim 9 and wherein:
(a) said annular collar being constructed of rubber.

11. An animal guard as in claim 1 and wherein:
(a) said plate including two or more additional slits extending completely through said skirt from said inner to said outer periphery thereby resulting a multi-piece annular flexible plate having additional radial edges.

12. An animal guard as in claim 11 and wherein:
(a) said additional radial edges provided with interlocking means.

13. An animal guard as in claim 1 and wherein:
(a) said plate being constructed of plastic material.

14. An animal guard as in claim 1 and wherein:
(a) said plate being constructed of metal.

15. An animal guard as in claim 2 and wherein:
(a) said second radial edge includes a fastener hole.

16. An animal guard as in claim 15 and wherein
(a) said fastener hole includes bolt means for cooperating therewith.

17. An animal guard as in claim 16 and wherein:
(a) said bolt means provided with a wing nut for connection therewith.

* * * * *